US006565945B1

(12) United States Patent
Nishikori et al.

(10) Patent No.: US 6,565,945 B1
(45) Date of Patent: May 20, 2003

(54) COMPOSITE PRINTING FILM

(75) Inventors: Yoshiharu Nishikori, Kawasaki (JP); Hiroyuki Yamada, Tochigi (JP); Koichi Katayama, Tokyo (JP); Yasushi Kobayashi, Chiba (JP); Eiichi Mikami, Chiba (JP)

(73) Assignee: Oji Paper Co. Ltd., Tokyo (JP)

( * ) Notice: Subject to any disclaimer, the term of this patent is extended or adjusted under 35 U.S.C. 154(b) by 0 days.

(21) Appl. No.: 09/280,714

(22) Filed: Mar. 30, 1999

(30) Foreign Application Priority Data

| | | |
|---|---|---|
| Mar. 30, 1998 | (JP) | 10-083982 |
| Dec. 28, 1998 | (JP) | 10-373747 |

(51) Int. Cl.$^7$ .................... B32B 5/16

(52) U.S. Cl. .................... 428/143; 428/141; 428/147; 428/148; 428/149; 428/338; 428/220; 428/480; 428/423.7; 428/424.6; 428/483; 428/518; 428/340; 428/341; 428/520

(58) Field of Search .................... 428/141, 143, 428/147, 148, 149, 338, 220, 480, 423.7, 424.6, 483, 518, 340, 341, 520

(56) References Cited

U.S. PATENT DOCUMENTS

| | | | | | |
|---|---|---|---|---|---|
| 4,075,050 | A | * | 2/1978 | Takashi et al. | 156/229 |
| 4,100,329 | A | * | 7/1978 | Neithardt, Jr. | 428/413 |
| 4,318,950 | A | * | 3/1982 | Takashi et al. | 428/143 |
| 4,708,907 | A | * | 11/1987 | Flutti et al. | 428/352 |
| 4,933,237 | A | * | 6/1990 | Krenceski et al. | 428/423.7 |
| 5,075,153 | A | * | 12/1991 | Malhotra | 428/207 |
| 5,312,671 | A | * | 5/1994 | Atherton et al. | 428/143 |
| 5,382,463 | A | * | 1/1995 | Adkins et al. | 428/141 |
| 5,389,178 | A | * | 2/1995 | Harvey | 156/249 |
| 5,389,422 | A | * | 2/1995 | Okazaki et al. | 428/141 |
| 6,001,469 | A | * | 12/1999 | Verardi et al. | 428/333 |

OTHER PUBLICATIONS

Convertex, No. 8, 1997, pp. 1–5 with partial English translation.

Japanese Industrial Standard, "Surface Roughness—Definitions and Designation", 1994.

* cited by examiner

*Primary Examiner*—William P. Watkins, III
(74) *Attorney, Agent, or Firm*—Arent Fox Kintner Plotkin & Kahn, PLLC

(57) ABSTRACT

A films composite useful for various printing methods, and particularly UV ray flexographic printing, includes a top layer formed on a substrate film made from a synthetic polymer, particularly polypropylene, containing a binder resin and having an arithmetical mean roughness Ra of 0.2 to 3.5 determined in accordance with JIS B 0601 and, optionally, an anchor layer formed between the substrate film and the top layer and containing an adhesive resin and an adhesive undercoat layer formed between the substrate film and the anchor layer and containing an adhesive resin.

10 Claims, No Drawings

COMPOSITE PRINTING FILM

BACKGROUND OF THE INVENTION

1. Field of the Invention

The present invention relates to a composite printing film. More particularly, the present invention relates to a composite printing film with an improved printability comprising, as a base film, a synthetic polymer film and especially a polypropylene film, and having an improved printability not only for conventional printing methods, for example, gravure printing, relief printing, and offset printing methods but also for a UV ray-flexographic printing method.

2. Description of the Related Arts

Polypropylene films comprising, as a principal component, a propylene homopolymer, a propylene copolymer and/or a mixture of two or more propylene homopolymers and copolymers, have excellent mechanical strengths and transparency and thus are widely usable as packing or wrapping films. However, since the polypropylene resins per se have a poor adhesive properties, the polypropylene films are disadvantageous in that the film surface exhibits a poor adhesion to printing inks, deposited metal layers and polyvinylidene chloride latices which are located on the film surface to form a barrier to a gas.

To overcome the above-mentioned disadvantages of the polypropylene films, Japanese Examined Patent Publication No. 57-14,983 discloses an adhesion-enhancing method in which an ionomeric polyolefin copolymer having polyethyleneimine moieties is coated on a polypropylene film surface. Also, it is generally known that a printing method suitable for the polypropylene films is a gravure printing method. Currently, however, as disclosed in “Convertech”, Aug., 1997, page 1, polypropylene films may be printed by a recent UV-ray flexographic printing technology which has a high print quality. Namely, conventional flexographic printing methods have been mainly applied to letter printing or solid printing. However, flexographic printing inks may be thickened or concentrated by ultraviolet ray-curing. Also, recently, laser engraving of an anilox roller, at an engraving density of 1000 to 1200 lines/25.4 mm, is possible by forming the anilox roller from a ceramic material, and thus process printing, with a high gradation, becomes possible.

With recent developments in UV-ray flexographic printing technology, the quality of the polymer film to be printed must be further enhanced. Especially, with respect to the adhesion of the polymer films to the ink, the polypropylene films are considered to cause no problems in the conventional flexographic, gravure, relief and offset printings. However, in the new UV-ray flexographic printing in which the UV-ray flexographic printing ink and printing system have been changed, a new problem in that the adhesion of the inks to be polypropylene films is poor, occurs.

SUMMARY OF THE INVENTION

An object of the present invention is to provide a composite printing film with an improved printability and exhibiting a high adhesion to printing inks even in UV ray-flexographic printing.

The above-mentioned object can be attained by the composite printing film of the present invention which comprises a substrate film comprising a synthetic polymeric material, and a top layer formed on a surface of the substrate film and comprising a binder resin, said top layer having a printing surface having an arithmetical mean roughness Ra of 0.2 to 3.5 μm, determined in accordance with Japanese Industrial Standard B 0601-1994.

In the composite printing film of the present invention, optionally an anchor comprising an adhesive resin layer is formed between the substrate film and the top layer.

In the composite printing film of the present invention, the binder resin of the top layer optionally contains at least one pigment selected from inorganic and organic pigments and dispersed in the binder resin.

Preferably, the pigment for the top layer is in the form of fine particles having an average particle size of 1 to 10 μm and is present in a content of 0.1 to 2% by weight based on the total weight of the top layer.

The inorganic and organic pigments for the top layer are preferably in the form of true spherical particles.

The binder resin for the top layer preferably contains at least one polymer having ester bonds of the formula:

—CO—O—

The ester bond (—CO—O—)-containing polymer for the top layer is preferably selected from the group consisting of homopolymers of a member and copolymers of at least one member each selected from the group consisting of acrylic acid, methacrylic acid, acrylate esters and methacrylate esters, polyester resins, ethylene-vinyl acetate copolymers, and vinyl chloride-vinyl acetate copolymers.

In the composite printing film of the present invention, the binder resin for the top layer is preferably selected from mixtures of (a) at least one ester bond-containing polymer having a glass-transition temperature of −20 to 20° C. with (b) at least one ester bond-containing polymer having a glass transition temperature of 40 to 80° C.

In the composite printing film of the present invention, the top layer is preferably present in an amount of 0.5 to 5 $g/m^2$.

In the composite printing film of the present invention, the adhesive resin for the anchor layer preferably contains an isocyanate component (A) comprising at least one member selected from the group consisting of:

(1) isocyanate compounds represented by the general formula (I)

(I)

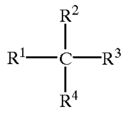

in which formula (I), at least two members of $R^1$ to $R^4$ respectively and independently from each other represent a member selected from the groups of the general formula (II):

(II)

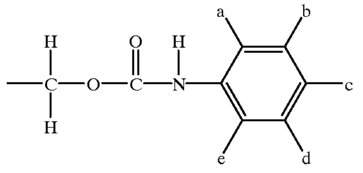

and the remaining members of $R^1$ to $R^4$ respectively represent a $—CH_3$ group, in which formula (II), one or more members of a, b, c, d and e respectively and independently from each other represent an —N═C═O group and the remaining members of a, b, c, d and e respectively and independently from each other represent a member selected from the group consisting of a hydrogen atom, a —$CH_3$ group and a chlorine atom, and (2) isocyanate compounds represented by the general formula (III):

(III)

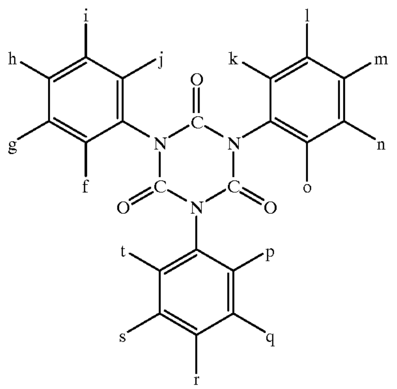

in which formula (III), at least one member of f, g, h, i and j, at least one member of k, l, m, n and o, and at least one member of p, q, r, s and t represent an —N=C=O group, and the remaining members of f to t respectively and independently from each other represent a member selected from the group consisting of a hydrogen atom, a —$CH_3$ group and a chlorine atom.

In the composite printing film of the present invention, the isocyanate component (A)-containing adhesive resin for the anchor layer optionally further comprises a copolymer component (B) comprising at least one copolymer of 70% to 95% by weight of vinyl chloride with 1 to 20% by weight of vinyl acetate and 0.1 to 10% by weight of at least one modifying ethylenically unsaturated comonomer, different from vinyl acetate, having at least one functional group selected from the group consisting of hydroxyl and carboxyl groups.

In the composite printing film of the present invention, preferably, the isocyanate component (A) and the copolymer component (B) are mixed in a weight ratio (A)/(B) of from 10/90 to 90/10.

In the above-mentioned formula (I) representing the isocyanate compounds (1) for the anchor layer, preferably three members of $R^1$, $R^2$, $R^3$ and $R^4$ represent the group of the general formula (II).

In the composite printing film of the present invention, the adhesive resin for the anchor layer preferably comprises at least one member selected from the group consisting of oxazoline group-containing polymer resins and ethylimine group-containing polymer resins.

In the composite printing film of the present invention, the ethylimine group-containing resins comprise at least one member selected from the group consisting of polyethyleneimine and amino-ethylated resins.

In the composite printing film of the present invention, the anchor layer is preferably present in an amount of 0.01 to 1 $g/m^2$.

In the composite printing film of the present invention, in the adhesive resin for the anchor layer, the isocyanate component (A) is presently present in a content of 2 to 30% by weight, based on the total weight of the adhesive resin.

The composite printing film of the present invention optionally further comprises an adhesive undercoat layer formed between the substrate film and the top layer, and comprising an adhesive resin.

The composite printing film of the present invention optionally further comprises an adhesive undercoat layer formed between the substrate film and the anchor layer, and comprising an adhesive resin.

In the composite printing film of the present invention, the adhesive resin for the adhesive undercoat layer preferably comprises at least one member selected from the group consisting of ethylene-(meth) acrylate ester-(meth) acrylic acid copolymers, ethylene-(meth) acrylate ester-(meth) acrylate salt copolymers, ethylene-(meth) acrylate ester-maleic anhydride copolymers and ethylene-gliycidyl(meth) acrylate copolymers.

In the composite printing film of the present invention, the adhesive undercoat layer is preferably present in an amount of 0.01 to 0.4 $g/m^2$.

In the composite printing film of the present invention, the substrate film is preferably selected from the group consisting of polyethylene films, polypropylene films, polystyrene films, polyvinyl alcohol films, polyester films and polycarbonate films.

DESCRIPTION OF THE PREFERRED EMBODIMENTS

In the composite printing film of the present invention, the substrate film is preferably selected from, polyolefin films (for example, polyethylene films and polypropylene films), polystyrene films, polyvinyl alcohol film, polyester films (for example, polyethyelene terephthalate films) and polycarbonate films. Among these polymer films, biaxially orientated propylene polymer films which have excellent transparency, superior travelling property in printer and high aptitude to packaging machines, are preferably utilized as the substrate film for the present invention.

In the present invention, the propylene polymers usable for forming the substrate film include propylene homopolymers; copolymers of propylene with at least one monomer selected from ethylene, α-olefins, for example, butene and 4-methyl pentene; aromatic hydrocarbons, typically styrene, dienes, typically butadiene, which are copolymerizable with propylene; mixtures of the propylene homopolymers with the propylene copolymers; and blends of at least one member selected from the propylene homopolymers and copolymers with at least one member sleeted from other polymer than the propylene homopolymers and copolymers, for example, polyethylene, ethylene-α-olefin copolymers; polystyrenes, synthetic rubbers, trepen resins, polyamides, polyesters and polyethers. There is no limitation to the type and amount of the comonomers for the propylene copolymers, and the polymer components blended with the propylene homopolymers and/or copolymers, as long as the properties of the polypropylene films are not deteriorated by them. In the propylene copolymers, the copolymerization content of propylene is preferably 75 molar % or more. In the propylene polymer blend, the total content of the propylene polymer is preferably 80 molar % or more.

The substrate film of the composite printing film of the present invention optionally contains at least one additive selected from, for example, lubricants, blocking-preventing agents, anti-oxidants, ultraviolet ray-absorbing agents, and pigments, which are usable as additives for conventional synthetic resin films.

In the composite printing films of the present invention, the substrate film, for example, a propylene polymer film may be selected from those produced by melt-extruding a synthetic polymer, for example, a propylene polymer to form an undrawn film; by drawing the undrawn film in the longitudinal or transverse direction thereof; and by further drawing the drawn film in the transverse or longitudinal direction thereof. The draw ratio in each of the longitudinal and transverse directions is preferably 2 to 20.

To enhance the wet surface tension of the substrate film surface, the desired one or two surfaces of the biaxially drawn film is preferably subjected to a conventional surface activity-enhancing treatment, for example, a corona discharge treatment or a flame treatment, to enhance the wet surface tension of the film to 36 dyne/cm or more.

When the wet surface tension is less than 36 dyne/cm, the resultant substrate film surface may repel a coating liquid for forming a top layer or an anchor layer on the substrate film surface.

There is no limitation to the thickness of the substrate film, for example, the biaxially orientated polypropylene film. Usually, the substrate film preferably has a thickness of 15 to 100 $\mu$m.

In the composite printing film of the present invention having an improved printability, the substrate film is coated with a top layer or with an anchor layer and a top layer arranged on the anchor layer. The top layer comprises a binder resin. The binder resin for the top layer preferably comprises at least one member selected from acrylic resins, polyester resins, ethylene-vinyl acetate copolymer resins, vinyl chloride-vinyl acetate copolymer resins. However, the binder resin is not limited to the above-mentioned resins.

In the composite printing film of the present invention, the top layer surface has an arithmetical mean roughness Ra of 0.2 to 3.5 $\mu$m, preferably 0.4 to 2.5 $\mu$m, more preferably 0.5 to 1.5 $\mu$m, determined in accordance with Japanese Industrial Standard B 0601-1994. When the arithmetical mean roughness Ra is less than 0.2 $\mu$m, the resultant composite printing film may cause a blocking phenomenon to occur when wound up, for example, during a printing procedure. Also, when the arithmetical mean roughness is more than 3.5 $\mu$m, the resultant composite printing film may exhibit too high a haze and thus may be opaque.

In the top layer of the composite film of the present invention, the binder resin optionally and preferably contains an organic and/or inorganic pigment. The pigment for the top layer preferably has an average particle size of 1 to 10 $\mu$m, and is contained in a content of 0.1 to 2% by weight, based on the total weight of the top layer. When the average particle size is less than 1 $\mu$m, the resultant top layer may cause a blocking phenomenon to occur on the composite film during printing thereof.

Also, the average particle size of the organic or inorganic pigment contained in the top layer is more than 10 $\mu$m, the pigment particles may be easily separated from the top layer, and the separated pigment may cause a blocking phenomenon to occur on the resultant composite film during printing or an unevenness in printing result to be generated during a relief printing. When the content of the organic or inorganic pigment in the top layer is less than 0.1% by weight, the resultant composite film may cause a blocking phenomenon thereof. Also when the content of the organic or inorganic pigment contained in the top layer is more than 2% by weight, the resultant composite film may exhibit too high a haze.

The pigment for the top layer of the composite printing film of the present invention is preferably selected from inorganic pigments, for example, silicon dioxide pigments, and organic pigments, for example, acrylic resin pigments (for example, polymethyl methacylate resin pigments), polystyrene resin pigments, and styrene-acrylic monomer copolymer pigments.

The above-mentioned organic and inorganic pigments preferably have a true spherical particle form.

The binder resin for the top layer preferably comprises at least one polymer having an ester bond of the formula:

$$-CO-O-$$

The ester bond-containing polymer is preferably selected from homopolymers of a member and copolymers of at least one member each selected from acrylic acid, methancrylic acid, acrylate esters and methacrylate esters, polyester resins, ethylene-vinyl acetate copolymers and vinyl chloride-vinyl acetate copolymers.

In a preferred example, the binder resin for the top layer is selected from mixtures of (a) at least one ester bond-containing polymer having a glass-transition temperature of −20 to 20° C. . with (b) at least one ester bond-containing polymer having a glass transition temperature of 40 to 80° C.

In the above-mentioned mixtures, the mixing weight ratio (b)/(a) of the low glass transition temperature polymer (a) to the high glass transition temperature polymer (b) is preferably 30/70 to 90/10, more preferably 50/50 to 70/30. When the ratio (b)/(a) is less than 30/70, the resultant composite film may cause a blocking phenomenon to occur during printing. Also, the ratio (b)/(a) is more than 90/10, the resultant top layer may exhibit an unsatisfactory adhesion to the UV ray-flexographic inks.

The acrylic resins for the binder resin of the top layer include, for example, homopolymers of a member and copolymers of two or members selected from acrylic acid, methyl acrylate, ethyl acrylate, n-propyl acrylate, isopropyl acrylate, n-butyl acrylate, sec-butyl acrylate, tert-butyl acrylate, pentyl acrylate, heptyl acrylate, hexyl acrylate, octyl acrylate, hexadecyl acrylate, dimethylpropyl acrylate, ethylpropyl acrylate, cyclohexyl acrylate, phenyl acrylate, benzyl acrylate, 2-tert-butylphenyl acrylate, naphthyl acrylate, chlorophenyl acrylate, cyanobenzyl acrylate, cyanophenyl acrylate, thiobutyl acrylate, isobornyl acrylate, methacrylic acid, methyl methacrylate and butyl methacrylate; and copolymers of at least one members selected from the above-mentioned acrylates and methacrylates with styrene.

The polyester resins for the binder resin of the top layer include, for example, the polyester resins as disclosed in "Polymer Data Handbook", Fundamental Part, edited by Society of Polymeric Science and published by BAIFUKAN, 1986, pages 532 to 533, for example, poly(2-hydroxyacetic acid), poly(hydroxy propionic acid, polyethylene oxalate, polymethylene azelate and polyethylene terephthalate. The above-mentioned polyester resins may be modified with hydroxyl groups or carboxyl groups.

In the ethylene-vinyl acetate copolymer resins and vinyl chloride-vinyl acetate copolymer resins usable for the binder resin of the top layer, the content of the polymerized vinyl acetate is preferably 50% by weight or more. When the vinyl acetate content is less than 50% by weight, the resultant top layer may exhibit an unsatisfactory adhesion to the UV ray-flexographic printing inks. The ethylene-vinyl acetate copolymer resins and the vinyl chloride-vinyl acetate copolymer resins usable for the present invention include hydroxyl or carboxyl group-modification products thereof.

In the composite printing film of the present invention, the top layer is preferably present in a coating weight of 0.5 to 5 $g/m^2$, more preferably 0.7 to 3 $g/m^2$. When the coating weight of the top layer is less than 0.5 $g/m^2$, the resultant top layer may be easily peeled out from the substrate film or the anchor layer. Also, when the coating amount of the top layer is more than 5 $g/m^2$, the resultant layer of a coating liquid for the top layer may not be completely dried within the limited time period of drying procedure, and thus the resultant composite film may cause a blocking phenomenon during the drying and succeeding procedures.

The top layer of the composite printing film of the present invention optionally comprises, in addition to the binder resin and the pigment, an antistatic agent, an antioxidant, an ultraviolet ray-absorbing agent, a coloring pigment, a dye, a viscosity modifier, a lubricant and inorganic fine particles (filler). Further, the top layer may contain a cross-linking agent, for example, an isocyanate component unless the cross-linking agent causes the aptitude of the resultant top layer to the UV ray flexographic printing inks to be degraded.

In the composite printing film of the present invention, optionally, an anchor layer comprising an adhesive resin is formed between the substrate film and the top layer. The adhesive resin for the anchor layer preferably comprises an isocyanate component (A) comprising at least one member selected from the group consisting of the isocyanate compounds (1) of the general formula (I) and the isocyanate compounds represented by the general formula (III). The adhesive resin for the anchor layer optionally comprises, in addition to the isocyanate component (A), a copolymer component (B) comprising at least one copolymer of vinyl chloride with vinyl acetate and at least one modifying comonomer other than vinyl chloride and vinyl acetate.

In the copolymer component (B) usable for the adhesive resin composition for the anchor layer, the vinyl chloride, vinyl acetate and the at least one modifying comonomer are copolymerized in a specifically controlled copolymerization weight ratio. For example, the copolymer component (B) preferably comprises at least one copolymer of 70% to 95% by weight of vinyl chloride with 1 to 20% by weight of vinyl acetate and 0.1 to 10% by weight of at least one modifying ethylenically unsaturated comonomer, different from vinyl acetate, having at least one functional group selected from the group consisting of hydroxyl and carboxyl groups.

When the copolymerized vinyl chloride content is less than 70% by weight, the resultant anchor layer may exhibit an insufficient adhesion to the substrate film. Also, when the copolymerized vinyl chloride content is more than 95% by weight, the resultant copolymer may exhibit an insufficient solubility in an organic solvent, for example, ethyl acetate and methylethylketone, and thus the preparation of the coating liquid for the anchor layer may become difficult. When the copolymerized vinyl acetate content is less than 1% by weight, the resultant copolymer may exhibit an insufficient solubility in an organic solvent, for example, ethyl acetate and methylethylketone, and thus the preparation of the coating liquid for the anchor layer may become difficult. Also, when the copolymerized vinyl acetate content is more than 20% by weight, the resultant anchor layer may exhibit an insufficient adhesion to the substrate film. Further, when the hydroxyl or carboxyl group-containing modifying comonomer is copolymerized in an amount of less than 0.5% by weight, the resultant anchor layer may exhibit an insufficient adhesion to the substrate film. When the copolymerized comonomer content is more than 10% by weight, the resultant copolymer may exhibit a poor solubility in the organic solvent for the coating liquid and thus may be difficult to be practically employed.

In the adhesive resin composition usable for the anchor layer, the isocyanate component (A) and the copolymer component (B) are mixed with each other preferably in a weight ratio (A)/(B) of 10/90 to 90/10, more preferably 20/80 to 80/20. When the mixing weight ratio (A)/(B) is controlled to the above-mentioned range, the resultant anchor layer exhibits a significantly enhanced adhesion to the substrate film.

In the general formula (III) for the isocyanate compounds (1) for the adhesive resin of the anchor layer, two or more members, preferably three or more members of $R^1$ to $R^4$ respectively and independently from each other represent a group selected from the groups of the general formula (II), and the remaining members of $R^1$ to $R^4$ respectively represent a $—CH_3$ group. In the general formula (II), at least one member, preferably one or two members of a to e attached to the benzene ring represent an —N═C═O group, and the remaining members of a to e respectively and independently from each other represent a member selected from a hydrogen atom, a $—CH_3$ group and a chlorine atom.

In the general formula (III) for the isocyanate compounds (2) for the adhesive resin of the anchor layer one or more members, preferably one or two members, of f to j, one or more members, preferably one or two members, of k to o and one or more members, preferably one or two members, of p to t attached to the benzene rings respectively represent an —N═C═O groups and the remaining members of f to t respectively and independently from each other represent a member selected from a hydrogen atom, a $—CH_3$ group and a chlorine atom.

The isocyanate compounds (1) defined by the general formulae (I) and (II) and the isocyanate compounds (2) represented by the general formula (III) may be intermolecularly bonded. For example, in the case where each benzene ring of the isocyanate compounds (1) and (2) contained in the anchor layer has one or more —N═C═O functional groups, the isocyanate groups of the isocyanate compounds (1) or (2) represented by the general formulae (I) and (II) or the formula (III) are intermolecularly bonded directly to each other, or some of the isocyanate groups of the isocyanate compounds (1) or (2) are intermolecularly bonded to each other through polyhydric alcohol residues, for example, diol residues or polyol residues, to cross-link the molecules of the compounds (1) or (2) to each other.

The isocyanate compounds (1) and (2) include, for example, naphthylene-1,5-diisocyanate, toluylenediisocyanate, diphenylmethanediisocyanate, tolylenediisocyanate, trimethylhexomethylenediisocyanate, isophoronediisocyanate, xylylenediisocyanate and hexanemethylenediisocyante; oligomers of the above-mentioned isocyanate compounds; and blocked isocyanate oligomers in which the oligomers of the above-mentioned isocyanate compounds are masked with a blocking agent, for example, phenol. Particularly, tolylenediisocyanate which can be cross-linked at low-temperature is preferred in the present invention. The above-mentioned isocyanate compounds may be employed alone or in a mixture of two or more thereof.

The adhesive resin for the anchor layer of the present invention include at least one member selected from, except for the above-mentioned isocyanate compounds, oxazoline group-containing resins and ethylimine group-containing resins.

These oxazoline group-containing resins and the ethylimine-containing resins may be employed alone or in a mixture of two or more thereof, optionally together with an epoxy compound which contributes to enhancing the water resistance of the resins.

The oxyzoline group-containing resin and/or the ethylimine group-containing resin is preferably contained in an amount of 50% by weight or more, more preferably 75% by weight or more in the anchor layer. When the content is less than 50% by weight, the resultant anchor layer may exhibit an unsatisfactory adhesion to the substrate film.

The ethylimine group-containing resins include, for example, polyethyleneimine resins and aminoethylated resins (which include organic solvent-dissolved resins in which ethyleneimine groups are introduced into a polymeric molecular skeleton, water-dissolved resins in which the amino groups of the ethylenimine group-introduced resin are neutralized by an acid, for example, acetic acid or hydrochloric acid, and water-dispersed resins prepared by emulsifying the ethyleneimine group-introduced resins).

The epoxy compound is not limited to specific compounds and can be selected from conventional epoxy compounds, for example, glycidylether compounds glycidylester compounds, glycidylamine compounds, linear aliphatic epoxide compounds and cycloaliphatic epoxide compounds.

In the composite printing film of the present invention, the anchor layer is preferably formed in an amount of 0.01 to 1 $g/m^2$, more preferably 0.03 to 0.3 $g/m^2$. When the anchor layer amount is less than 0.01 $g/m^2$, the adhesion-enhancing effect of the resultant anchor layer to the substrate film (or an adhesive undercoat layer) or the top layer may be unsatisfactory. Also, when the anchor layer amount is more than 1 $g/m^2$, the resultant anchor layer may not be fully dried within the desired drying procedure time, and the cost for the anchor layer may be too high and thus an economical disadvantage may occur.

There is no limitation to the procedures of forming the anchor layer or the top layer on the substrate film, for example a biaxially orientated polypropylene film. The anchor layer and/or the top layer can be formed by conventional coating systems, for example, meyer bar, gravure, microgravure, die, blade, microrod, air knife, curtain, slide and roll coating systems. The coating liquids for the anchor layer and/or the top layer may contain, as a liquid medium, water or an organic solvent.

In the composite printing film of the present invention, optionally, an adhesive undercoat layer may be formed between the substrate film and the top layer or between the substrate film and the anchor layer. The adhesive undercoat layer comprises an adhesive resin.

The adhesive resin for the adhesive undercoat layer may comprise at least one member selected from olefin polymers, for example, polyethylene, ethylene-propylene copolymers, ethylene-propylene-butene-1 copolymers and ethylene-butene-1 copolymers. Preferably, the adhesive undercoat layer resin for the adhesive undercoat layer comprises at least one member selected from the group consisting of ethylene-(meth) acrylate ester-(meth) acrylic acid terpolymers, ethylene-(meth) acrylate ester-(meth) acrylate salt terpolymers, ethylene-(meth) acrylate ester-maleic anhydride terpolymers and ethylene-gliycidyl(meth) acrylate copolymers.

The terpolymers of ethylene, (meth)acrylate esters and (meth)acrylic acid or its salts usable for the adhesive undercoat layer of the present invention are preferably random terpolymers of 30 to 90% by weight of ethylene, 10 to 70% by weight in total of the (meth)acrylate esters and the (meth)acrylic acid or the (meth)acrylate salts. When the content of ethylene in the terpolymers is less than 30% by weight, the resultant adhesive undercoat layer may peel off from the substrate film, particularly a propylene polymer film. Also, when the ethylene content is more than 90% by weight, the resultant adhesive undercoat layer may exhibit insufficient adhesive property to the anchor layer or the top layer. Further when the total content of the (meth)acrylate esters and the (meth)acrylic acid or (meth)acrylate salts is more than 70% by weight, the resultant adhesive undercoat layer may peel off from the substrate sheet, particularly the propylene polymer film.

The ethylene-(meth)acrylate ester-maleic anhydride terpolymers usable for the adhesive undercoat layer are preferably random terpolymers in which ethylene is present in an amount of 30 to 90% by weight, and the weight ratio of the (meth)acrylate esters to the maleic anhydride is in the range of from 20/1 to 1/1. When the ethylene content in the terpolymers is less than 30% by weight, the resultant adhesive undercoat layer may exhibit an insufficient adhesive property to the substrate film, particularly the propylene polymer film. Also, when the ethylene content in the terpolymers is more than 90% by weight, the resultant adhesive undercoat layer may exhibit an insufficient adhesive property to the anchor layer or the top layer.

The ethylene-glycidyl(meth) acrylate ester copolymers usable for the adhesive undercoat layer are preferably random copolymers of 30 to 90% by weight of ethylene with 10 to 70% by weight of glycidyl(meth) acrylate esters. When the ethylene content is less than 30% by weight, the resultant adhesive undercoat layer may be unsatisfactory in adhesive performance to the substrate film, particularly the propylene polymer film. Also, when the ethylene content of the copolymer is more than 90% by weight, the resultant adhesive undercoat layer may be unsatisfactory in the adhesive performance to the anchor layer or the top layer. The adhesive undercoat layer is preferably formed in an amount of 0.01 to 0.4 $g/m^2$, more preferably 0.05 to 0.2 $g/m^2$. When the amount of the adhesive undercoat layer is less than 0.05 $g/m^2$, the resultant adhesive undercoat layer may exhibit an insufficient adhesive property to the top layer or the anchor layer. When the amount of the adhesive undercoat layer is more than 0.4 $g/m^2$, the adhesive effect of the resultant adhesive undercoat layer may be saturated and cause an economical disadvantage due to the increased cost thereof.

In the present invention, there is no limitation to the procedures for forming the adhesive undercoat layer. For example, when as a substrate film, a biaxially orientated polypropylene film is used, the adhesive undercoat layer can be formed on the substrate film by the same coating method as that for the above-mentioned anchor layer and top layer. In another embodiment, for example, a polypropylene sheet is produced by melt-extruding a polypropylene resin through a film-forming die, by drawing the resultant undrawn polypropylene sheet at a draw ratio of 3 to 10 in the longitudinal direction of the sheet, by applying a corona discharge treatment to at least one surface of the resultant longitudinally drawn polypropylene film, by coating the corona discharge-treated polypropylene film surface with a coating liquid containing an aqueous dispersion resin comprising at least one member of the above-mentioned ethylene terpolymers and copolymers, by drying the coating liquid layer to form an adhesive undercoat layer; then by drawing the adhesive undercoat layer-coated film in the transverse direction of the film at a draw ratio of 3 to 10.

In this procedures, in the preparation of the biaxially orientated substrate film, particularly polypropylene film, the adhesive undercoat layer is orientated in the transverse direction of the film.

In another methods for forming the adhesive undercoat layer, a polypropylene resin is melt-extruded to form an undrawn polypropylene substrate sheet; then the undrawn polypropylene sheet is drawn at a draw ratio of 3 to 10 in the longitudinal direction thereof; a coating resin for an adhesive undercoat layer is laminated by a melt-extruding method on the longitudinally drawn polypropylene sheet; and then the resultant laminate is drawn in the transverse direction thereof at a draw ratio of 3 to 10.

In still another method for forming the adhesive undercoat layer, a laminated film is produced by a co-melt-extruding method from a polypropylene for the substrate film and a coating resin for the adhesive undercoat layer, and then is biaxially drawn by a conventional drawing procedure to such an extent that the surface area of the laminated film is expanded to 9 to 100 times the original area.

There is no limitation to an optional application of a conventional surface-activating procedure, for example, a corona discharge or flame treatment to the two surfaces of the composite film of the present invention having an enhanced printability, to prevent the increase in haze of the film to a level of 8% or more.

EXAMPLES

The present invention will be further illustrated by the following examples which are merely representative and do not restrict the scope of the present invention in any way. The term "part" used in the examples means "part by dry weight", unless specifically indicated otherwise.

The resultant composite printing films of the examples and comparative examples were subjected to the following tests.

(1) Adhesion to UV Ray Flexographic Printing Ink

A testing sample of the composite printing film was subjected to an UV ray flexographic printing. An adhesive tape having a width of 18 mm (made by OJI KAKO K.K.) was adhered to the printed surface of the composite film, and then released from the printed surface. The degree of removal of the printed ink with the adhesive tape from the printed surface was evaluated by the naked eye observation into two classes, namely "good" and "bad".

(2) Relief Printability

A relief printing was applied to a sample of the composite printing film. The uniformity and clarity of the printed images on the composite film was evaluated by the naked eye observation into two classes, namely "good" and "bad".

(3) Arithmetical Mean Roughness Ra

The arithmetical mean roughness Ra of the sample of the composite printing film was determined in accordance with JIS B 0601-1994.

(4) Blocking Resistance

A sample of the composite printing film was cut into regular squares of 50 mm×50 mm. Two pieces of the cut sample were superposed on each other to provide a specimen. Five specimens were prepared. Each specimen was interposed between two press plates having dimensions of 60 mm×60 mm, and a weight of 2 kg was placed on the press plates containing therebetween the specimen, to form a testing assemblage. The assemblage was left to stand at a temperature of 40±1° C. at a relative humidity of 70±2% for 24 hours.

Thereafter, the specimen is removed form the press plates and then the two samples of the composite printing film were peeled off from each other by hand. When the samples could be separated from each other, the blocking resistance of the composite printing film was evaluated "good", and when the samples could not be separated from each other, the blocking resistance of the composite film was evaluated "bad".

(5) Haze

A sample of the composite printing film was subjected to a measurement of haze in accordance with Japanese Industrial Standard K-7105.

Example 1

An undrawn polypropylene sheet having a thickness of 1600 μm and a width of 270 mm was produced by feeding a polypropylene resin having an intrinsic viscosity [η] of 2.4, determined in tetrahydronaphthalene at a temperature of 135° C. and a boiling n-pentene extraction residue (i,i) of 97% into a melt-extruder having a cylinder diameter of 50 mm, by melt-extruding the polypropylene resin at a temperature of 290° C. through a T die, and by rapidly cool-solidify the extruded filmy polyethylene melt stream to a temperature of 40° C.

The undrawn polypropylene sheet was drawn at a draw ratio of 5 in the longitudinal direction of the sheet. A corona discharge treatment was applied to a surface of the mono-axially drawn film in a spark gap treatment system (using corona discharge treatment apparatus made by TOMOE KOGYO K.K., treatment power: 1.2 kw), to enhance the wet surface tension of the film surface to 40 dyne/cm. A longitudinally drawn polypropylene film was obtained.

The corona discharge-treated surface of the drawn polypropylene film was coated with a coating film for an adhesive undercoat layer having the composition as shown below, by a gravure printing system and dried to form an adhesive undercoat layer having a dry weight of 0.1 g/m$^2$.

Coating liquid for adhesive undercoat layer

| Component | Amount (part) |
|---|---|
| Ethylene-acrylate ester-maleic anhydride copolymer resin having a solid content of 40% by weight (trademark: M220E, made by SUMITOMO SEIKA K.K.) | 100 |

The adhesive undercoat layer-coated polyethylene film was drawn at a draw ratio of 8 in the transverse direction thereof. Thereafter, a corona discharge treatment was applied to the adhesive undercoat layer surface to increase the wet surface tension of the adhesive undercoat layer to a level of 46 dyne/cm. The resultant biaxially oriented, adhesive undercoat layer-coated and corona discharge treated film had a thickness of 40 μm and the coating weight of the adhesive undercoat layer was 0.01 g/m$^2$.

Then, a coating liquid (1) for an anchor layer having the composition as shown below and containing, as a solvent, ethyl acetate was coated on the corona discharged surface of the biaxially oriented and adhesive undercoat layer-coated polypropylene film by gravure printing system and dried to form an anchor layer having a dry weight of 0.2 g/m$^2$.

| Anchor layer-coating liquid (1) | |
|---|---|
| Component | Amount (part) |
| Vinyl chloride-vinyl acetate copolymer resin (trademark: VROH, made by UNION CARBIDE CO.) | 50 |
| Isocyanate compound of the formula (IV) | 50 |

Formula (IV):

(IV)

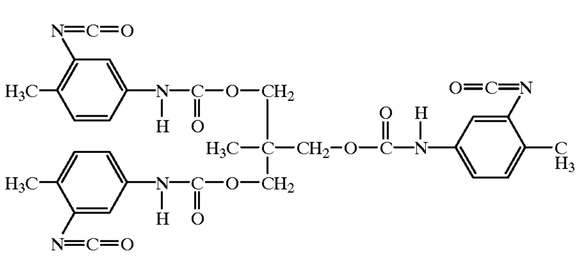

| Top layer-coating liquid (1) | |
|---|---|
| Component | Amount (part) |
| Polyester resin (glass transition temperature: 4° C., trademark: VYLON 530, made by TOYOBO K.K.) | 50 |
| Polyester resin (glass transition temperature: 45° C., trademark: VYLON 600, made by TOYOBO K.K.) | 50 |
| Organic pigment (true spherical poly (methyl methacrylate) particles, average particle size: 5 to 7 μm, trademark: EPOSTAR MA1006, made by K.K. NIPPON SHOKUBAI) | 1 |

Then, on the anchor layer, a coating liquid (1) for a top layer having the composition as shown below and containing, as a solvent medium, toluene was coated by a gravure coating system and dried to form a top layer in a dry weight of 2 $g/m^2$.

The top layer of a sample of the resultant composite printing film was subjected to a flexographic printing by using a K Printing Proofer (made by R K Print-Coat Instruments Ltd.), and the printed ink images were cured by irradiating ultraviolet rays. The inks used for the printing were available under the trademark of BESTCURE UV FLEXO WHITE FP, from T & K TOKA CO. The printed ink layers had a thickness of 10 μm.

The top layer of another sample of the composite printing film was subjected to a relief printing using a relief printer (trademark: OPM-W250-U7S, made by ONDA SEISAKUSHO) and printing inks (trademark: UV CARD BLACK, made by THE INTEC CO.) The resultant ink layers had a thickness of 1 μm.

Onto each of the UV-ray flexographic printed surface and the relief printed surface of the composite printing film, an adhesive tap (made by OJI KAKO K.K.) was adhered, and then released therefrom, to evaluate the adhesion of the top layer to the inks.

The blocking resistance and the haze of the composite film were tested.

The test results are shown in Table 1.

Example 2

A transparent composite printing film was produced by the same procedures as in Example 1, except that the top layer-coating layer (1) was replaced by a top layer coating liquid (2) having the following composition.

| Top layer-coating liquid (2) | |
|---|---|
| Component | Amount (part) |
| Polyester resin (glass transition temperature: −16° C., trademark: VYLON 550, made by TOYOBO K.K.) | 50 |
| Polyester resin (glass transition temperature: 67° C., trademark: VYLON 200, made by TOYOBO K.K.) | 50 |
| Organic pigment (true spherical poly (methyl methacrylate) particles, average particle size: 4 to 5 μm, trademark: EPOSTAR MA1004, made by K.K. NIPPON SHOKUBAI) | 1.5 |

The test results are shown in Table 1.

Comparative Example 1

A transparent composite printing film was produced by the same procedures as in Example 1, except that the top layer-coating layer (1) was replaced by a top layer coating liquid (3) having the following composition.

| Top layer-coating liquid (3) | |
|---|---|
| Component | Amount (part) |
| Acrylic resin (glass transition temperature: 15° C., trademark: ACRYDIC A-157, made by DAINIPPON INKIKAGAKUKOGYO K.K.) | 50 |
| Acrylic resin (glass transition temperature: 49° C., trademark: ACRYDIC A-166, made by DAINIPPON INKIKAGAKUKOGYO K.K.) | 50 |
| Inorganic pigment (amorphous silica particles, average particle size: 2.4 μm, trademark: MIZUKASIL P-527, made by K.K. MIZUSAWA KAGAKU K.K.) | 0.2 |

The test results are shown in Table 1.

Comparative Example 2

A transparent composite printing film was produced by the same procedures as in Example 1, except that the top layer-coating layer (1) was replaced by a top layer coating liquid (4) having the following composition.

| Top layer-coating liquid (4) | |
|---|---|
| Component | Amount (part) |
| Polyester resin (glass transition temperature: 4° C., trademark: VYLON 530, made by TOYOBO K.K.) | 50 |

-continued

| Top layer-coating liquid (4) | |
|---|---|
| Component | Amount (part) |
| Polyester resin (glass transition temperature: 45° C., trademark: VYLON 600, made by TOYOBO K.K.) | 50 |
| Organic pigment (true spherical poly (methyl methacrylate) particles, average particle size: 12 to 15 $\mu$m, trademark: EPOSTAR MA1013, made by K.K. NIPPON SHOKUBAI) | 3 |

The test results are shown in Table 1.

Comparative Example 3

A transparent composite printing film was produced by the game procedures as in Example 1, except that the top layer-coating layer (1) was replaced by a top layer coating liquid (5) having the following composition.

| Top layer-coating liquid (5) | |
|---|---|
| Component | Amount (part) |
| Polyester resin (glass transition temperature: 4° C., trademark: VYLON 530, made by TOYOBO K.K.) | 50 |
| Polyester resin (glass transition temperature: 45° C., trademark: VYLON 600, made by TOYOBO K.K.) | 50 |
| Organic pigment (true spherical melamine-formaldehyde resin particles, average particle size: 0.25 to 0.55 $\mu$m, trademark: EPOSTAR S-6 made by K.K. NIPPON SHOKUBAI) | 1 |

The test results are shown in Table 1.

Comparative Example 4

A transparent composite printing film was produced by the same procedures as in Example 1, except that the top layer-coating layer (1) was replaced by a top layer coating liquid (6) having the following composition.

| Top layer-coating liquid (6) | |
|---|---|
| Component | Amount (part) |
| Polyester resin (glass transition temperature: 67° C., trademark: VYLON 200, made by TOYOBO K.K.) | 100 |
| Organic pigment (true spherical poly (methyl methacrylate) particles, average particle size: 1 to 2 $\mu$m, trademark: EPOSTAR MA1001, made by K.K. NIPPON SHOKUBAI) | 0.01 |

The test results are shown in Table 1.

Comparative Example 5

A transparent composite printing film was produced by the same procedures as in Example 1, except that the top layer-coating layer (1) was replaced by a top layer coating liquid (7) having the following composition.

| Top layer-coating liquid (7) | |
|---|---|
| Component | Amount (part) |
| Acrylic resin (glass transition temperature: 15° C., trademark: ACRYDIC A-157, made by DAINIPPON INKIKAGAKUKOGYO K.K.) | 50 |
| Acrylic resin (glass transition temperature: 49° C., trademark: ACRYDIC A-166, made by DAINIPPON INKIKAGAKUKOGYO K.K.) | 50 |
| Organic pigment (true spherical poly (methyl methacrylate) particles, average particle size: 4 to 5 $\mu$m, trademark: EPOSTAR MA-1004, made by K.K. NIPPON SHOKUBAI) | 5 |

The test results are shown in Table 1.

Example 3

A transparent composite printing film was produced by the same procedures as in Example 1, except that the top layer-coating layer (1) was replaced by a top layer coating liquid (8) having the following composition.

| Top layer-coating liquid (8) | |
|---|---|
| Component | Amount (part) |
| Acrylic resin (glass transition temperature: 15° C., trademark: ACRYDIC A-157, made by DAINIPPON INKIKAGAKUKOGYO K.K.) | 50 |
| Acrylic resin (glass transition temperature: 49° C., trademark: ACRYDIC A-166, made by DAINIPPON INKIKAGAKUKOGYO K.K.) | 50 |
| Organic pigment (true spherical poly (methyl methacrylate) particles, average particle size: 4 to 5 $\mu$m, trademark: EPOSTAR MA-1004, made by K.K. NIPPON SHOKUBAI) | 0.5 |

The test results are shown in Table 1.

Example 4

A transparent composite printing film was produced by the same procedures as in Example 1, except that the top layer-coating layer (1) was replaced by a top layer coating liquid (9) having the following composition.

| Top layer-coating liquid (9) | |
|---|---|
| Component | Amount (part) |
| Acrylic resin (glass transition temperature: 15° C., trademark: ACRYDIC A-157, made by DAINIPPON INKIKAGAKUKOGYO K.K.) | 50 |
| Acrylic resin (glass transition temperature: 90° C., trademark: ACRYDIC 56-1155, made by DAINIPPON INKIKAGAKUKOGYO K.K.) | 50 |
| Inorganic pigment (true spherical silica particles, average particle size: 4 $\mu$m, trademark: CYCLOSPHERE 1504, made by FUJI SILICIA K.K.) | 1 |

The test results are shown in Table 1.

Example 5

A transparent composite printing film was produced by the same procedures as in Example 1, except that the top layer-coating layer (1) was replaced by a top layer coating liquid (10) having the following composition.

Top layer-coating liquid (10)

| Component | Amount (part) |
|---|---|
| Polyester resin (glass transition temperature: −16° C., trademark: VYLON 550, made by TOYOBO K.K.) | 45 |
| Polyester resin (glass transition temperature: −17° C., trademark: VYLON 555, made by TOYOBO K.K.) | 45 |
| Polyester resin (glass transition temperature: 67° C., trademark: VYLON 200, made by TOYOBO K.K.) | 10 |
| Organic pigment (true spherical poly (methyl methacrylate) particles, average particle size: 5 to 7 $\mu$m, trademark: EPOSTAR MA1006, made by K.K. NIPPON SHOKUBAI) | 2 |

The test results are shown in Table 1.

Example 6

A transparent composite printing film was produced by the same procedures as in Example 1, except that the top layer-coating layer (1) was replaced by a top layer coating liquid (11) having the following composition.

Top layer-coating liquid (11)

| Component | Amount (part) |
|---|---|
| Polyester resin (glass transition temperature: −17° C., trademark: VYLON 555, made by TOYOBO K.K.) | 10 |
| Polyester resin (glass transition temperature: 67° C., trademark: VYLON 200, made by TOYOBO K.K.) | 90 |
| Organic pigment (true spherical poly (methyl methacrylate) particles, average particle size: 4 to 5 $\mu$m, trademark: EPOSTAR MA1004, made by K.K. NIPPON SHOKUBAI) | 0.1 |

The test results are shown in Table 1.

Comparative Example 6

A transparent composite printing film was produced by the same procedures as in Example 1, except that the top layer-coating layer (1) was replaced by a top layer coating liquid (12) having the following composition.

Top layer-coating liquid (12)

| Component | Amount (part) |
|---|---|
| Acrylic resin (glass transition temperature: 15° C., trademark: ACRYDIC A-157, made by DAINIPPON INKIKAGAKUGOGYO K.K.) | 100 |
| Organic pigment (true spherical poly (methyl methacrylate) particles, average particle size: 4 to 5 $\mu$m, trademark: EPOSTAR MA-1004, made by K.K. NIPPON SHOKUBAI) | 0.05 |

The test results are shown in Table 1.

Comparative Example 7

A transparent composite printing film was produced by the same procedures as in Example 1, except that the top layer coating layer (1) was replaced by a top layer coating liquid (13) having the following composition.

Top layer-coating liquid (13)

| Component | Amount (part) |
|---|---|
| Polyester resin (glass transition temperature: 72° C., trademark: VYLON 280, made by TOYOBO K.K.) | 100 |
| Organic pigment (true spherical poly (methyl methacrylate) particles, average particle size: 4 to 5 $\mu$m, trademark: EPOSTAR MA1004, made by K.K. NIPPON SHOKUBAI) | 3 |

The test results are shown in Table 1.

Comparative Example 8

A transparent composite printing film was produced by the same procedures as in Example 1, except that the top layer-coating layer (1) was replaced by a top layer coating liquid (14) having the following composition.

Top layer-coating liquid (14)

| Component | Amount (part) |
|---|---|
| Acrylic resin (glass transition temperature: 15° C., trademark: ACRYDIC A-157, made by DAINIPPON INKIKAGAKUKOGYO K.K.) | 50 |
| Acrylic resin (glass transition temperature: 94° C., trademark: ACRYDIC A-195, made by DAINIPPON INKIKAGAKUKOGYO K.K.) | 50 |
| Organic pigment (true spherical poly (methyl methacrylate) particles, average particle size: 4 to 5 $\mu$m, trademark: EPOSTAR MA1004, made by K.K. NIPPON SHOKUBAI) | 3 |

The test results are shown in Table 1.

Example 7

A transparent composite printing film was produced by the same procedures as in Example 1, except that the anchor layer-coating liquid (1) was replaced by a anchor layer-coating liquid (2) having the composition as shown below.

| Anchor layer-coating liquid (2) | |
|---|---|
| Component | Amount (part) |
| Vinyl chloride-vinyl acetate copolymer resin (trademark: VROH, made by UNION CARBIDE CO. | 50 |
| The compound of the formula (V) | 50 |

Formula (V):

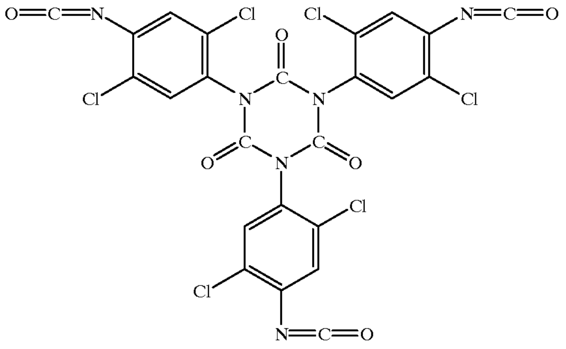

The test results are shown in Table 1.

Example 8

A transparent composite printing film was produced by the same procedures as in Example 6, except that the anchor layer-coating liquid (1) was replaced by an anchor layer-coating liquid (3) having the composition as shown below, and the anchor layer was formed in a dry weight of 1 g/m$^2$.

| Anchor layer-coating liquid (3) | |
|---|---|
| Component | Amount (part) |
| Aminoethylated resin (trademark: SK-1000, made by K.K. NIPPON SHOKUBAI) | 50 |
| Oxazoline group-containing resin (trademark: EPOCROS WS-500, made by K.K. NIPPON SHOKUBAI) | 50 |

The test results are shown in Table 1.

Example 9

A transparent composite printing film was produced by the same procedures as in Example 6, except that the top layer-coating layer (1) was replaced by a top layer coating liquid (4) having the composition as shown below, and the anchor layer was formed in a dry weight of 0.01 g/m$^2$.

| Anchor layer-coating liquid (4) | |
|---|---|
| Component | Amount (part) |
| Polyethyleneimine (trademark: EPOMIN P-1000, made by K.K. NIPPON SHOKUBAI) | 75 |
| Epoxy compound (trademark: DICONAL EX-321, made by NAGASE KASEI K.K.) | 25 |

The test results are shown in Table 1.

Example 10

A transparent composite printing film was produced by the same procedures as in Example 6, except that the anchor layer-coating liquid (1) was replaced by an anchor layer-coating liquid (5) having the composition as shown below.

| Anchor layer-coating liquid (5) | |
|---|---|
| Component | Amount (part) |
| Aminoethylated resin (trademark: NK-350, made by K.K. NIPPON SHOKUBAI) | 100 |

The test results are shown in Table 1.

Example 11

A transparent composite printing film was produced by the same procedures as in Example 1, except that the adhesive undercoat layer-coating liquid (1) was replaced by an adhesive undercoat layer-coating liquid (2) having the composition as shown below.

| Adhesive undercoat layer-coating liquid (2) | |
|---|---|
| Component | Amount (part) |
| Ethylene-Acrylate ester-acrylic acid or its salt copolymer (trademark: CHEMIPAL S-300, made by MITSUI KAGAKU K.K.) | 100 |

The test results are shown in Table 1.

Example 12

A transparent composite printing film was produced by the same procedures as in Example 1, except that the adhesive undercoat layer-coating liquid (1) was replaced by an adhesive undercoat layer-coating liquid (3) having the composition as shown below.

| Adhesive undercoat layer-coating liquid (3) | |
|---|---|
| Component | Amount (part) |
| Ethylene-glycidylacrylate ester copolymer (trademark: G 118, made by SUMITOMO SEIKA K.K.) | 100 |

The test results are shown in Table 1.

Example 13

A transparent composite printing film was produced by the same procedures as in Example 1, except that no anchor layer was formed and the top layer was formed from a top layer-coating liquid (15) having composition as shown below.

| Top layer-coating liquid (15) | |
|---|---|
| Component | Amount (part) |
| Polyester resin (glass transition temperature: −17° C., trademark: VYLON 555, made by TOYOBO K.K.) | 45 |

-continued

| Top layer-coating liquid (15) | |
|---|---|
| Component | Amount (part) |
| Polyester resin (glass transition temperature: 67° C., trademark: VYLON 200, made by TOYOBO K.K.) | 45 |
| Compound of the formula (VI) shown below | 10 |
| Organic pigment (true spherical poly (methyl methacrylate) particles having an average particle size: 4 to 5 $\mu$m, trademark: EPOSTAR MA1004, made by K.K. NIPPON SHOKUBAI) | 2 |

Formula (VI):

(VI)

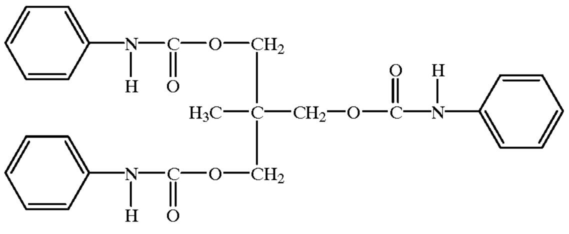

The test results are shown in Table 1.

Comparative Example 9

A transparent composite printing film was produced by the same procedures as in Example 1, except that no anchor layer was formed, and the top layer was formed from a top layer-coating liquid (16) having the composition as shown below.

| Top layer-coating liquid (16) | |
|---|---|
| Component | Amount (part) |
| Acrylic resin (glass transition temperature: 15° C., trademark: ACRYDIC A-157, made by DAINIPPON INKIKAGAKUGOGYO K.K.) | 50 |
| Acrylic resin (glass transition temperature: 94° C., trademark: ACRYDIC A-195, made by DAINIPPON INKIKAGAKUGOGYO K.K.) | 50 |
| Organic pigment (true spherical poly (methyl methacrylate) particles, average particle size: 4 to 5 $\mu$m, trademark: EPOSTAR MA1004, made by K.K. NIPPON SHOKUBAI) | 3 |

The test results are shown in Table 1.

| | Item | | | | |
|---|---|---|---|---|---|
| Example No | Adhesion of UV ray Flexo-graphic printing ink | Relief printa-bility | Arithmetical mean roughness ($\mu$m) | Blocking resistance | Haze |
| Example | | | | | |
| 1 | good | good | 1.2 | good | 4.2 |
| 2 | good | good | 1.8 | good | 4.9 |
| 3 | good | good | 0.8 | good | 3.7 |
| 4 | good | good | 1.5 | good | 4.1 |
| 5 | good | good | 2.3 | good | 4.9 |
| 6 | good | good | 0.5 | good | 3.5 |
| 7 | good | good | 1.2 | good | 4.1 |
| 8 | good | good | 0.2 | good | 2.5 |
| 9 | good | good | 0.4 | good | 2.2 |
| 10 | good | good | 1.0 | good | 3.6 |
| 11 | good | good | 1.1 | good | 4.2 |
| 12 | good | good | 1.2 | good | 4.1 |
| 13 | good | good | 2.3 | good | 5.1 |
| Comparative Example | | | | | |
| 1 | good | good | 0.1 | bad | 2.9 |
| 2 | good | bad | 4.0 | good | 9.1 |
| 3 | good | good | 0.1 | bad | 3.1 |
| 4 | bad | good | 0.1 | bad | 3.0 |
| 5 | good | good | 5.5 | good | 12.0 |
| 6 | good | good | 0.1 | bad | 3.0 |
| 7 | bad | bad | 4.5 | good | 8.8 |
| 8 | bad | good | 4.4 | good | 8.5 |
| 9 | bad | good | 4.4 | good | 8.6 |

The composite printing film of the present invention has excellent aptitudes to various printing methods and a superior adhesion to inks for UV ray flexographic printing and thus is very useful for industry.

What is claimed is:

1. A composite printing film comprising:

a substrate film comprising a synthetic polymeric material;

an adhesive undercoat layer formed on the substrate film and comprising an adhesive resin comprising at least one member selected from the group consisting of ethylene-(meth) acrylate ester-(meth) acrylic acid copolymers, ethylene-(meth) acrylate ester-(meth) acrylate salt copolymers, ethylene -(meth) acrylate ester-maleic anhydride copolymers and ethylene-glycidyl(meth) acrylate copolymers:

an anchor layer formed on the adhesive undercoat layer and comprising at least one member selected from the group consisting of oxazoline group-containing polymer resins and ethylimine group-containing polymer resin; and a top layer formed on a surface of the anchor layer and comprising a binder resin comprising a mixture of (a) at least one polymer having ester bonds of the formula:

$$—CO—O—,$$

and exhibiting a glass-transition temperature of −20 to 20° C. with (b) at least one ester bond-containing polymer having a glass transition temperature of 40 to 80° C., said top layer having a printing surface having an arithmetical mean roughness Ra of 0.2 to 3.5 $\mu$m, determined in accordance with Japanese Industrial Standard B 0601-1994.

2. The composite printing film as claimed in claim 1, wherein in the top layer, the binder resin contains at least one pigment selected from inorganic and organic pigments and dispersed therein.

3. The composite printing film as claimed in claim 2, wherein the pigment for the top layer is in the form of fine particles having an average particle size of 1 to 10 $\mu$m, and is present in a content of 0.1 to 2% by weight based on the total weight of the top layer.

4. The composite printing film as claimed in claim 2, wherein the inorganic and organic pigments for the top layer is in the form of true spherical particles.

5. The composite printing film as claimed in claim 1, wherein the ester bond (—CO—O—)-containing polymer is selected from the group consisting of homopolymers of a member and copolymers of at least one member selected from the group consisting of acrylic acid, methacrylic acid, acrylate esters and methacrylate.

6. The composite printing film as claimed in claim 1, wherein the top layer is present in an amount of 0.5 to 5 $g/m^2$.

7. The composite printing film as claimed in claim 1, wherein the ethylimine group-containing polymer resins are selected from the group consisting of polyethyleneimines and aminoethylated resins.

8. The composite printing film as claimed in claim 1, wherein the anchor layer is present in an amount of 0.01 to 1 $g/m^2$.

9. The composite printing film as claimed in claim 1, wherein the adhesive undercoat layer is present in an amount of 0.01 to 0.4 $g/m^2$.

10. The composite printing film as claimed in claim 1, wherein the substrate films is selected from the group consisting of polyethylene films, polypropylene films, polystyrene films, polyvinyl alcohol films, polyester films and polycarbonate films.

* * * * *